United States Patent [19]
Gonzalez et al.

[11] Patent Number: 5,538,708
[45] Date of Patent: Jul. 23, 1996

[54] EXPANSION SECTION AS THE INLET TO THE FLUE IN A TITANIUM DIOXIDE PROCESS

[75] Inventors: Raul A. Gonzalez, Newark, Del.; Charles D. Musick, Waverly, Tenn.

[73] Assignee: E. I. Du Pont de Nemours and Company, Wilmington, Del.

[21] Appl. No.: 350,350

[22] Filed: Dec. 6, 1994

[51] Int. Cl.⁶ ............................................. C01G 23/047
[52] U.S. Cl. ................................. 423/613; 423/614
[58] Field of Search ........................... 423/613, 614; 106/437; 138/38, 39, 44; 165/147, 146

[56] References Cited

U.S. PATENT DOCUMENTS

| | | | |
|---|---|---|---|
| 3,403,001 | 9/1968 | Mas et al. | 423/613 |
| 4,462,979 | 7/1984 | Stevens et al. | 423/613 |
| 4,569,387 | 2/1986 | Hartmann et al. | 165/147 |
| 4,803,056 | 2/1989 | Morris et al. | 423/613 |
| 4,937,064 | 6/1990 | Gonzalez | 423/613 |

FOREIGN PATENT DOCUMENTS 815976  6/1969  Canada .................................. 423/613

*Primary Examiner*—Steven Bos
*Attorney, Agent, or Firm*—David J. Gould

[57] ABSTRACT

In the process for producing titanium dioxide by (a) reacting titanium tetrachloride and oxygen in the vapor phase in a reactor to produce titanium dioxide, and (b) subsequently cooling the titanium dioxide by passing it through a flue consisting of a conventional flue, a finned flue, or combinations thereof, wherein the outlet for the reactor in step (a) has a smaller interior diameter than the inlet for the flue in step (b), the improvement comprising passing the titanium dioxide through a truncated cone-shaped finned flue conduit, the smaller diameter end of the truncated cone-shaped finned flue conduit receiving titanium dioxide produced by the reactor and the larger diameter end of the truncated cone-shaped finned flue conduit discharging titanium dioxide that is received by the flue.

8 Claims, 2 Drawing Sheets

EXPANSION SECTION AS THE INLET TO THE FLUE IN A TITANIUM DIOXIDE PROCESS

BACKGROUND OF THE INVENTION

Substantial quantities of titanium dioxide pigment are produced commercially by reacting titanium tetrachloride with oxygen in the vapor phase. After such reaction, the titanium dioxide reaction mass is cooled by passing it through a conduit, i.e., flue, where growth of the titanium dioxide pigment particles takes place and agglomeration of such particles takes place.

It is desirable to cool the titanium dioxide rapidly because this will result in pigment having higher carbon black undertone ("CBU"). CBU is described in U.S. Pat. No. 2,488,440, which is hereby incorporated by reference.

The cooling of the titanium dioxide can take place in a conventional flue, i.e., a conduit having a substantially smooth interior. Or, if desired, a finned flue can be used, i.e., a conduit having a plurality of substantially longitudinal, internal, protuberances, depressions or both. Suitable finned flues are described in U.S. Pat. No. 4,937,064, which is hereby incorporated by reference.

However, as production rates increase or there is a need for additional cooling, the interior diameter of the flue sometimes needs to be increased so that it is larger than the interior diameter of the outlet of the reactor to oxidize $TiCl_4$ to $TiO_2$. The need therefore exists for a suitable transition piece.

SUMMARY OF THE INVENTION

In the process for producing titanium dioxide by (a) reacting titanium tetrachloride and oxygen in the vapor phase in a reactor to produce titanium dioxide, and (b) subsequently cooling the titanium dioxide by passing it through a flue consisting of a conventional flue, a finned flue, or combinations thereof, wherein the outlet for the reactor in step (a) has a smaller interior diameter than the inlet for the flue in step (b), the improvement comprising passing the titanium dioxide through a truncated cone-shaped finned flue conduit, the smaller diameter end of the truncated cone-shaped finned flue conduit receiving titanium dioxide produced by the reactor and the larger diameter end of the truncated cone-shaped finned flue conduit discharging titanium dioxide that is received by the flue.

Figure 1:
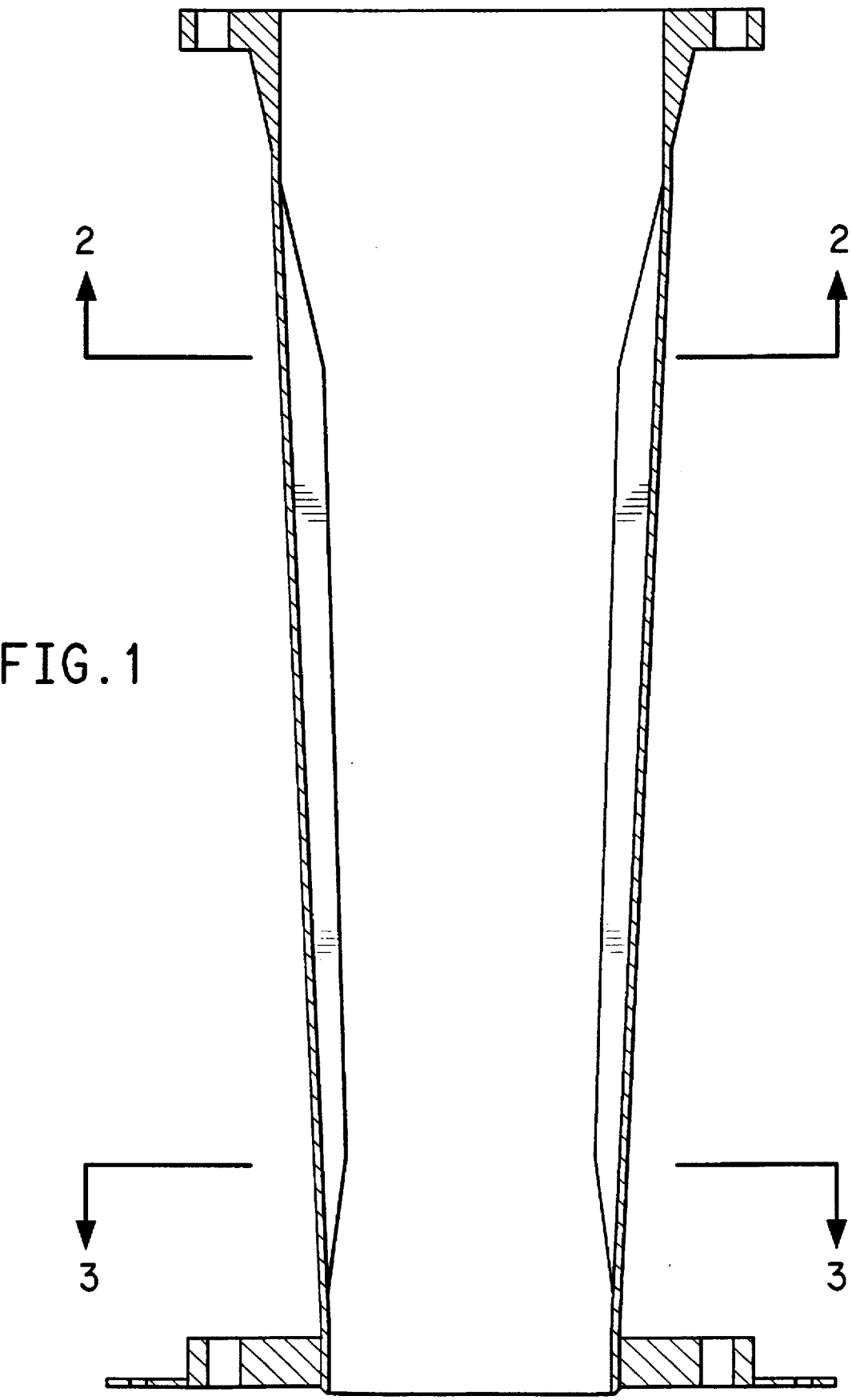
FIG. 1 is a longitudinal cross-section of an embodiment of the truncated cone-shaped finned flue conduit of this invention.

It has been found that the process of this invention can reduce the amount of large particles of $TiO_2$, and especially those in excess of 0.6 micron in diameter. The process of this invention can also permit higher production rates while maintaining acceptable CBU and particle size.

DETAILED DESCRIPTION OF THE INVENTION

The process for producing titanium dioxide pigment by reacting oxygen and titanium tetrachloride in the vapor phase is disclosed, for example, in U.S. Pat. Nos. 2,488,439, 2,488,440, 2,559,638, 2,833,627, 3,208,866, and 3,505,091. The disclosures of such patents are hereby incorporated by reference.

Such reaction typically takes place in a reactor in the form of a pipe or conduit, wherein oxygen and titanium tetrachloride are introduced at a suitable temperature and pressure for production of the titanium dioxide. In such reaction, a flame generally is produced.

Flue

Downstream from the flame, the titanium dioxide produced is fed through an additional length of conduit wherein cooling takes place. For the purposes herein, such conduit will be referred to as the flue. The flue should be as long as necessary to accomplish the desired cooling. Typically, the flue is water cooled and can be about 50–3000, preferably about 100–2500, and most preferably about 200–2000 feet long.

The flue can be a conventional flue, a finned flue or combinations thereof.

A preferred finned flue is described in U.S. Pat. No. 4,937,064, which is hereby incorporated by reference. The finned flue will have a plurality of substantially longitudinal, internal protuberances, depressions or both. Examples of suitable protuberances include ridges and/or fins. Examples of depressions include grooves and/or cuts. Examples of both protuberances and depressions include a conduit having similar shaped protuberances and depressions such as a pipe having a corrugated surface. Preferred is a finned flue having protuberances; especially preferred is a finned flue having internal fins. Another preferred embodiment is a finned flue having with internal, hollow fins.

The finned flue used in this invention can be any suitable shape that does not cause excessive turbulence. Preferably, the finned flue will be round, i.e., in the form of a pipe.

Because the finned flue used in this invention can be more expensive than a conventional flue, typically, only a portion of the flue will be a finned flue. Also, because most of the cooling of the $TiO_2$ will take place in close proximity to the flame of the titanium dioxide reaction, preferably, the finned flue will be used in close proximity to the reaction flame, and continue thereafter until the point is reached where substantially all or most of the growth and/or agglomeration of the pigment particles ceases. Typically, the length of the finned flue used will be about 5–500, more preferably about 5–300, and most preferably about 5–100 feet. If desired, however, all or most of the flue can be finned flue; and, if so, this can decrease the required length because of the more efficient cooling it provides.

The following additional considerations should be taken into account in designing the finned flue:

To enhance cooling, there generally should be as many protuberances and/or depressions as possible, provided, however, that (1) there are not too many which would cause close spacing and consequently adherence between them of pigment or the particles of any material that are injected to scour the flue, and (2) the protuberances are not so thin that they substantially erode or corrode. Preferably, the spacings between the protuberances and/or depressions will be about equal.

Generally, the protuberances and/or depressions should be substantially longitudinal, i.e., located along the length of the finned flue. By the term "substantially longitudinal" is meant that the protuberances and/or depressions should be substantially parallel (i.e., parallel to the axis of the conduit) or somewhat angled, (i.e., similar to the grooves in a rifle barrel). Preferably, the protuberances and/or depressions will be substantially parallel.

In regard to the height of the protuberances, they preferably should be as high as possible to enhance cooling, but not so high that they seriously erode (due to a high tip temperature) or cause increased turbulence.

The composition of the finned flue should be any material that is chlorine resistant and has good heat transfer properties; preferred is nickel or a nickel alloy such as alloys commercially available as Nickel 200 or Nickel 201. Nickel 200 is commercially pure wrought nickel having a minimum of 99% nickel. Nickel 201 is the low carbon version of Nickel 200.

Preferably, the tips of the protuberances should be thinner than the base of the protuberances; preferred are protuberances of a trapezoidal shape where the spaces between the protuberances are depressions which are rounded.

Preferably, the protuberances are tapered, i.e., the inlet and outlet portions of the flue will have a protuberance height less than that at the highest point of the protuberances; especially preferred are protuberances that are tapered and flush with the interior of the flue at its inlet and outlet.

Preferably, the interior diameter of the finned flue of this invention should be that which does not in itself cause substantial turbulence with the velocity and other conditions for the $TiO_2$ and other materials in the flue. Typical interior diameters of the finned flue are about 2–50 inches, preferably about 5–30 inches, and most preferably about 6–20 inches. Often, the finned flue will have a conduit interior diameter that is greater than that of the conventional flue to which it is attached. In the foregoing and as elsewhere used herein, (a) "interior diameter" means the distance between the two lowest points in the flue that are opposite each other, and (b) "upstream" or "downstream" are in reference to the flow of titanium dioxide pigment through the flue. Preferably, the diameter of the finned flue, when measured from tip to tip of protuberances which are opposite each other, will be greater than or approximately equal to the diameter of the conventional flue to which it is attached.

If it is desired to optimize the gloss properties of the $TiO_2$ pigment, the protuberances and/or depressions should be designed to reduce turbulence without reducing the cooling rate. Conversely, if it is desired to optimize the CBU of the $TiO_2$ pigment, the cooling rate should be improved without increasing turbulence.

Truncated Cone-Shaped Conduit

The truncated cone-shaped finned flue conduit will have a plurality of internal, substantially longitudinal protuberances, depressions or both. The factors and considerations for designing the protuberances and depressions for the truncated cone-shaped finned flue conduit are similar to those described above for the finned flue. Preferably, if a finned flue is used also, then the truncated cone-shaped finned flue conduit will have its protuberances and depressions aligned with those of the finned flue.

If a conventional flue is used in conjunction with a truncated cone-shaped finned flue conduit, then the length of such truncated, cone-shaped finned conduit typically will be about 5–500, more preferably about 5–300, and most preferably about 5–100 feet. If a finned flue is used in conjunction with a truncated cone-shaped finned flue conduit, then the length of such truncated cone-shaped finned flue conduit can be shorter, i.e., typically about 0.5–100, preferably about 1–50, and most preferably about 1–20 feet. Preferably, (1) the length of the truncated cone-shaped finned flue conduit, if used alone, or (2) the combined length of the truncated cone-shaped finned flue conduit plus the finned flue, if used in combination, should be sufficient to permit all or most of the agglomeration and growth of the particle size of the $TiO_2$ to take place.

Preferably, the smaller diameter end of the truncated cone-shaped finned flue conduit has an interior diameter about equal to the interior diameter of the outlet for the reactor in step (a). Also, preferably, the larger diameter end of the truncated cone-shaped finned flue conduit has an interior diameter about equal to the interior diameter of the flue.

Often, between the reactor and the truncated cone-shaped finned flue conduit, there will be a section of conduit where particulate solids are injected to scrub and remove titanium dioxide adhered to the interior walls of the truncated cone-shaped finned flue conduit and the flue (hereinafter "scrubs conduit"). If such scrubs conduit is used, typically, the inlet thereof is connected to the outlet for the reactor, and the outlet for such scrubs conduit is connected to the smaller diameter end of the truncated cone-shaped finned flue conduit. Thus as used herein, "outlet for the reactor" means the actual outlet for the reactor when no scrubs conduit is connected to such reactor and the outlet for the scrubs conduit when a scrubs conduit is connected to the outlet for the reactor.

Typically, the smaller diameter end of the truncated cone-shaped finned flue conduit will be connected to the outlet of the reactor, and the larger diameter end of the truncated cone-shaped finned flue conduit will be connected to the inlet for the flue.

The composition of the truncated, cone-shaped finned flue conduit should be any material that is chlorine resistant and has good heat transfer properties. Preferred is nickel or nickel alloys such as commercially available Nickel 200 or Nickel 201.

EXAMPLE 1

$TiCl_4$ vapor containing vaporized $AlCl_3$ was heated and continuously admitted to the upstream portion of a vapor phase reactor of the type disclosed in U.S. Pat. No. 3,203,763. Simultaneously, preheated oxygen was metered through a separate inlet adjacent to the $TiCl_4$ inlet and was continuously admitted to the reactor. Connected to the reactor was a scrubs conduit that introduced particulate scrubbing material.

Figure 2:
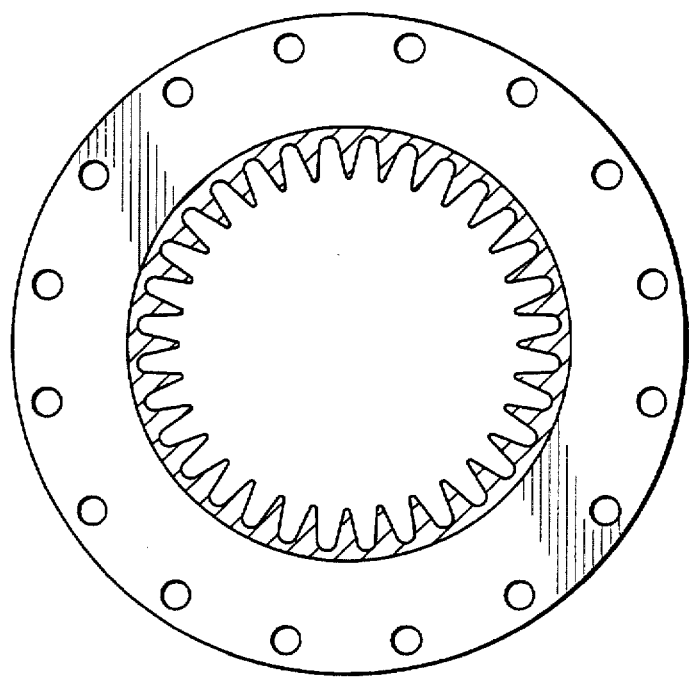
FIG. 2 is a cross-section of the large diameter end of the truncated cone-shaped finned flue conduit of FIG. 1.
Figure 3:
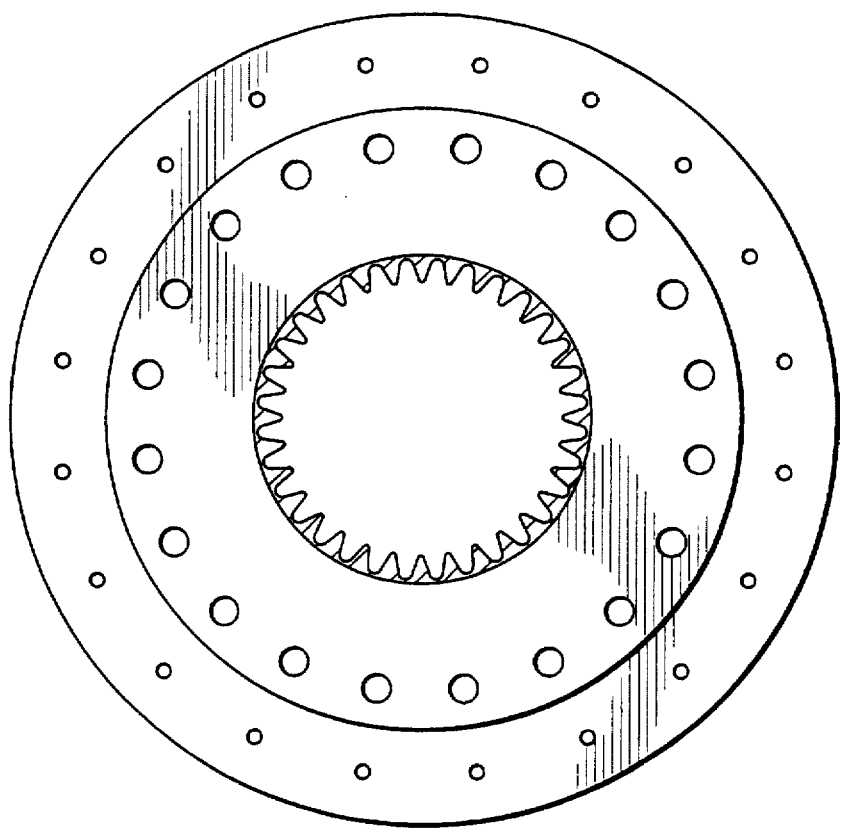
FIG. 3 is a cross-section of the small diameter end of the truncated cone-shaped finned flue conduit of FIG. 1.

Attached to the downstream end of the scrubs conduit was either (a) a truncated cone-shaped finned flue conduit of this invention depicted in FIGS. 1, 2 and 3, or (b) essentially the same conduit but having a smooth interior rather than fins (hereinafter referred to as a conventional truncated cone-shaped conduit).

The small diameter end of the conventional truncated cone-shaped conduit or the truncated cone-shaped finned flue conduit, whichever was being tested, was attached to the outlet (i.e., downstream end) of the scrubs conduit.

The interior diameter of both the conventional truncated cone-shaped conduit and the truncated cone-shaped finned flue conduit increased about 30 percent from the small diameter end to the large diameter end. The large diameter end of the conventional truncated cone-shaped conduit or the large diameter end of the truncated cone-shaped finned flue conduit, whichever was being tested, was connected to a finned flue. The outlet for the finned flue was connected to a conventional flue.

Using the above reactor system, titanium dioxide was produced at a constant rate. Run 1 was made with the conventional truncated cone-shaped conduit, and Run 2 was made with the truncated cone-shaped finned flue conduit of this invention shown in FIGS. 1, 2 and 3. It was found that use of the truncated cone-shaped finned flue conduit of this invention decreased the amount of titanium dioxide having a particle size in excess of 0.6 microns by 5.6 percent. The variance in certain conditions from Run 1 to Run 2 was as follows:

| absolute pressure - | 5.0 percent increase, |
|---|---|
| CBU - | 1.6 percent decrease, |
| alkali metal nucleant - | 19.3 percent decrease. |

If the pressure, CBU, and alkali metal nucleant were the same for each run, then the decrease in the amount of titanium dioxide having a particle size in excess of 0.6 microns would be expected to be about 4.6 percent.

We claim:

1. In the process for producing titanium dioxide by (a) reacting titanium tetrachloride and oxygen in the vapor phase in a reactor to produce titanium dioxide, and (b) subsequently cooling the titanium dioxide by passing it through a flue consisting of a conventional flue, a finned flue, or combinations thereof, wherein the outlet for the reactor in step (a) has a smaller interior diameter than the inlet for the flue in step (b), the improvement comprising passing the titanium dioxide through a truncated cone-shaped finned flue conduit, the smaller diameter end of the truncated cone-shaped finned flue conduit receiving titanium dioxide produced by the reactor and the larger diameter end of the truncated cone-shaped finned flue conduit discharging the titanium dioxide that is received by the flue.

2. The process of claim 1 wherein the flue consists of a finned flue attached to a conventional flue and the inlet for the flue is the finned flue.

3. The process of claim 1 wherein the finned flue and the truncated cone-shaped finned flue conduit have a plurality of substantially longitudinal protuberances having tips and bases, and wherein the tips of the protuberances are thinner than the bases of the protuberances.

4. The process of claim 3 wherein the protuberances are trapezoidal in shape, there are spaces between the protuberances, and the spaces between such protuberances are rounded depressions.

5. The process of claim 1 wherein the interior diameter of the flue is about 2–50 inches.

6. The process of claim 1 wherein the substantially longitudinal protuberances and depressions for the finned flue and the truncated cone-shaped finned flue conduit are aligned.

7. The process of any one of claims 1–6 wherein the flue and cone-shaped finned flue conduit comprise nickel or a nickel alloy.

8. The process of any one of claims 1–6 wherein:

the small diameter end of the truncated cone-shaped finned flue conduit has an interior diameter about equal to the interior diameter of the outlet for the reactor in step (a), and the larger diameter end of the truncated cone-shaped finned flue conduit has an interior diameter about equal to the interior diameter of the flue.

\* \* \* \* \*